No. 874,261. PATENTED DEC. 17, 1907.
W. V. TURNER.
GRADUATED RELEASE VALVE MECHANISM FOR FLUID PRESSURE BRAKES.
APPLICATION FILED MAR. 27, 1906.
2 SHEETS—SHEET 1.
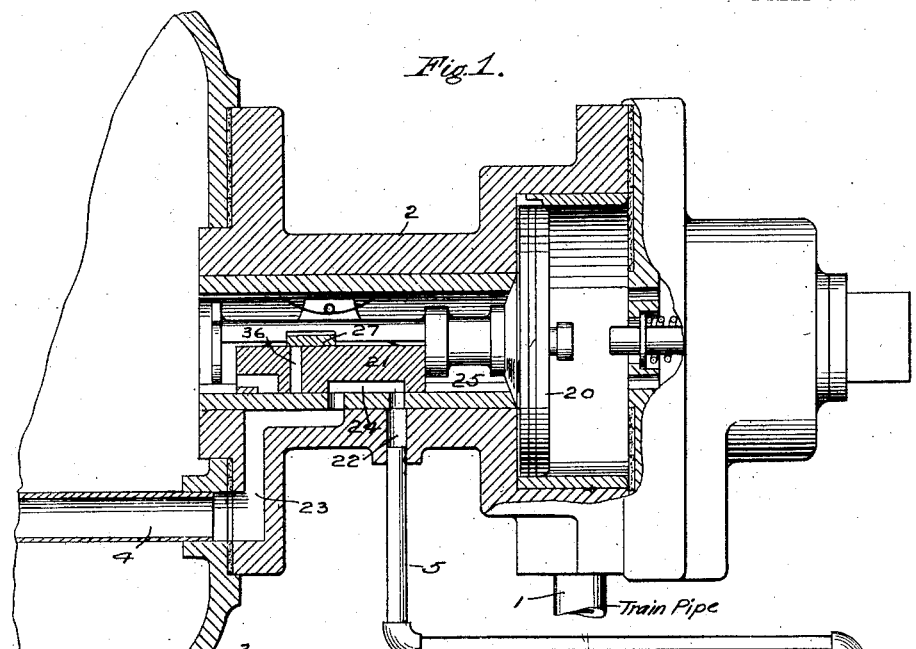
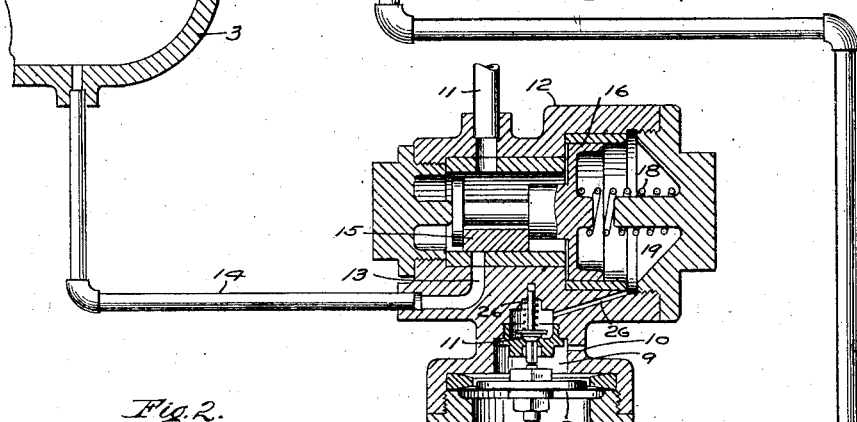
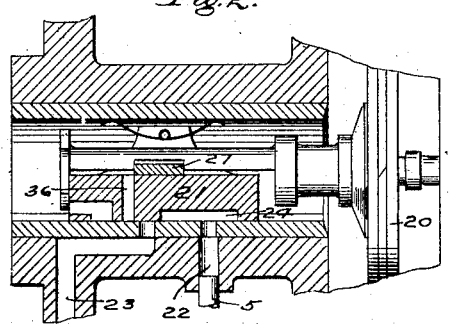
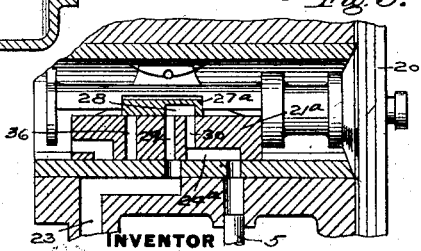
WITNESSES
INVENTOR
Walter V. Turner
by E. Wright
Att'y.

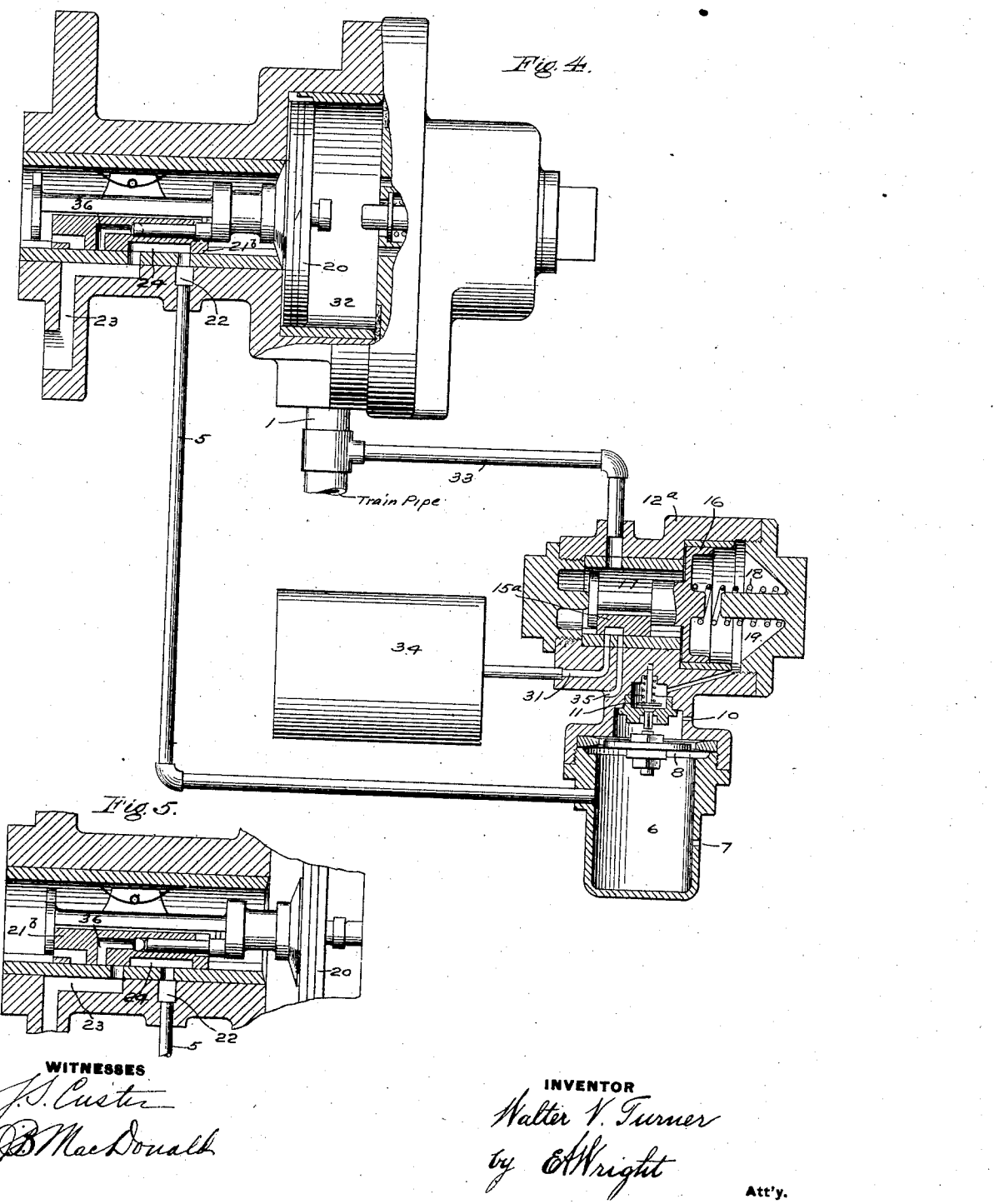

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF PITTSBURG, PENNSYLVANIA, A CORPORATION OF PENNSYLVANIA.

GRADUATED-RELEASE-VALVE MECHANISM FOR FLUID-PRESSURE BRAKES.

No. 874,261.     Specification of Letters Patent.     Patented Dec. 17, 1907.

Application filed March 27, 1906. Serial No. 308,309.

*To all whom it may concern:*

Be it known that I, WALTER V. TURNER, a citizen of the United States, residing in Wilkinsburg, in the county of Allegheny and State of Pennsylvania, have invented certain new and useful Improvements in Graduated-Release-Valve Mechanism for Fluid-Pressure Brakes, of which the following is a specification.

My invention relates to automatic fluid pressure brakes for railway cars, and has for its object to provide new and improved means for effecting a graduated release of fluid under pressure from the brake cylinder whereby the brake cylinder pressure may be graded down to any desired amount without entirely releasing the same.

In the accompanying drawings, which illustrate my invention, Figure 1 is a vertical section through a triple valve device, a part of an auxiliary reservoir, and through valve mechanism applied thereto for effecting a graduated release of fluid under pressure from the brake cylinder; Fig. 2 is a vertical section through a portion of the triple valve device shown in Fig. 1, but showing the main slide valve and graduating valve in different positions from those shown in Fig. 1; Fig. 3 is a section through a portion of a triple valve device showing a modified form of the main slide valve and of the graduating valve; Fig. 4 shows a modification of my improvement applied to a triple valve device; and Fig. 5 shows the main slide valve and graduating valves of Fig. 4, but in different positions.

In the embodiment of my invention illustrated in Fig. 1 of the drawings, the triple valve device 2 is shown secured to one end of an auxiliary reservoir 3, which is provided with a pipe 4, extending therethrough and forming a passage between the triple valve device and the brake cylinder. This is a construction commonly employed in the Westinghouse system for freight brakes.

In accordance with my invention I provide means, controlled by the exhaust from the brake cylinder, for securing a graduated release of fluid under pressure from the brake cylinder.

As shown in Fig. 1 of the drawings, a pipe, or passage, 5, connects the exhaust port of the triple valve device with a chamber 6, having an opening 7, of suitable size, to the atmosphere. A diaphragm, or piston, 8, separates the chamber 6 from the chamber 9, and is exposed on one side to the pressure in chamber 6, and on the other side to the pressure in chamber 9 which is open at all times to the atmosphere through the passage 10.

In the casing 12 is a port 13 which communicates with the interior of the auxiliary reservoir 3, through a pipe, or passage, 14; and the port 13 is controlled by a valve 15, which is connected with and operated by the movements of the piston 16. The chamber 17 is normally charged with fluid under pressure through a pipe or passage 11, which communicates with a main reservoir, a supplemental reservoir, or any other desirable or convenient source of fluid under pressure, and the piston 16 is normally held in the position shown in Fig. 1 by the spring 18 and the pressure of fluid in the chamber 19, which fluid under pressure passes around the piston 16 from the chamber 17.

When the brakes are applied in the usual way, by a reduction of train pipe pressure, the piston 20, and slide valve 21 of the triple valve device, are moved out to the usual service position, so as to close communication between the exhaust passage 22 and the brake cylinder passage 23 and to cut off the pipe or passage 5 from communication with the brake cylinder. The service port 36 is then open to the brake cylinder port 23, and air flows from the auxiliary reservoir to the brake cylinder until the pressure in the auxiliary reservoir is reduced to or slightly below that of the train pipe when the piston moves the graduating valve back to lap and closes the service port in the usual manner. When it is desired to effect a graduated or partial release of the brakes, the train pipe pressure is increased sufficiently to move the slide valve 21 back into the position shown in Fig. 1, in which position the slide valve 21 connects the pipe or passage 5 with the brake cylinder through the passages 4, 23, 22, and the cavity 24 in the slide valve. Air from the brake cylinder then flows into the chamber 6, and out through the opening or port 7 to the atmosphere. At the same time, the pressure in the chamber 6 acting on the lower side of the diaphragm 8 moves it upward and unseats the valve 11, thereby releasing fluid under pressure from the chamber 19 on the right of piston 16, through the passage 26, chamber 9, and port or opening 10, to the atmosphere. The pressure of the fluid in chamber 17 then moves piston 16 and valve 15 to the right, and uncovers the passage 13, thereby permitting a flow of fluid under pressure through pipe 11, chamber 17, passage 13, and pipe 14, into the auxiliary reservoir 3. The increase of pressure thus effected in the auxiliary reservoir, and in the chamber 25 on the left of the triple valve piston 20, as soon as it is sufficient to counteract the comparatively slightly increased train pipe pressure, moves the triple valve piston 20 and the slide valve 21 to the position shown in Fig. 2, and closes the exhaust from the brake cylinder. The pressure is then exhausted from the chamber 6, through the port or passage 7, and the small puppet valve 11 is seated by the pressure of the spring 26, thereby cutting off the chamber 19 from the atmosphere and permitting an accumulation of pressure in the chamber 19 on the right of the piston 16, which accumulation of pressure, together with the pressure of the spring 18, moves piston 16 and valve 15 to the left, closes the passage 13, and checks the increase of pressure in the auxiliary reservoir.

If it is desired to effect a further reduction of brake cylinder pressure, the train pipe pressure may be again sufficiently increased to move the piston 20 and slide valve 21 into release position, as shown in Fig. 1, and the fluid under pressure from the brake cylinder will again flow through passages 23, 21, 22, pipe or passage 5, chamber 6, and port 7, to the atmosphere. The pressure in chamber 6 will then again move the diaphragm 8 and unseat the small valve 11. Fluid under pressure will again be released from chamber 19 to the atmosphere through passage 26, chamber 9, and port 10; the piston 16 and valve 15 will be moved to the right to open passage 13, and fluid under pressure will flow to the auxiliary reservoir until the pressure therein is sufficient to overcome the train pipe pressure and cut off the release from the brake cylinder. The reduction of pressure in chamber 6 will then permit the seating of valve 11, pressure will again accumulate in chamber 19 and the piston 16 and valve 15 will be moved to the left to cut off the flow of fluid to the auxiliary reservoir. This operation may be repeated as often as required to grade down the brake cylinder pressure to any desired amount, and a full release may be effected thereby, or, by a full recharging of the train pipe, as is the usual practice.

The source of fluid under pressure, from which fluid is supplied through passages 13 and 14 to the auxiliary reservoir, may be a supplemental reservoir charged from the train pipe, or in any other desired manner; or a main reservoir supplied by a pump may be located on the car, or a main reservoir pipe line extending through the train may be connected with main reservoirs on all or some of the cars of a train; or, if only a single line of pipe is used, supplementary reservoirs may be employed; and it is to be understood that my invention is not limited to any particular construction or arrangement for providing a source of fluid under pressure for the purpose referred to.

My improvement is not limited to the specific means herein described and shown in the different modifications, but the important and essential feature of my invention comprises any means whereby a graduated release of the brakes is controlled by the exhaust from the brake cylinder.

In Fig. 3 of the drawings, I have shown a modification of my invention whereby the graduated release of air from the brake cylinder through the main slide valve is controlled by the graduating valve $27^a$. The graduating valve and main slide valve shown in Fig. 3 may be substituted for the graduating valve 27 and main slide valve 21 shown in Fig. 1 without other change in the devices or connections shown in Fig. 1, and already described.

In Fig. 3 the graduating valve $27^a$ is provided with a cavity 28 which is adapted to connect the two passages 29 and 30 in the main slide valve and to permit the release of fluid from the brake cylinder when the parts are in release position; and when the auxiliary reservoir pressure is sufficiently increased to move the piston 20 back against the train pipe pressure, as already described, the exhaust from the brake cylinder will be cut off by the movement of the graduating valve only, without any movement of the main slide valve being required.

In Fig. 4 of the drawings, I have shown a modification of my invention, whereby the exhaust from the brake cylinder controls the operation of the valve device $12^a$ for effecting a reduction of train pipe pressure and thereby limiting or graduating the release of the brakes, instead of securing such limitation or graduation by an increase in the auxiliary reservoir pressure. With the construction shown in Fig. 4, when the piston 20 and slide valve $21^b$ have been moved into the release position, as shown, by a moderate increase of train pipe pressure, fluid under pressure from the brake cylinder will pass through the passages 23, 24, 22, and 5, into the chamber 6, and through port 7 to the atmosphere. The pressure in the chamber 6 acting on the diaphragm 8 will unseat the valve 11 and release the fluid under pressure from the chamber 19 on the right of the piston 16, as described in referring to Fig. 1. The piston 16 and valve $15^a$ will be moved to the right so as to uncover the passage 31, and fluid under pressure will flow from the train pipe 1 and chamber 32 of the triple valve device, through pipe 33, chamber 17, and passage 31, into the reservoir 34. The reduction of pressure, thus effected in the chamber 32, will permit the auxiliary reservoir pressure on the left of piston 20 to move piston 20 and slide valve $21^b$ to the right, as shown in Fig. 5, and cut off the exhaust from the brake cylinder. The reduction of pressure in the chamber 6 will permit the seating of the valve 11, and the accumulation of pressure on the right of piston 16; and the valve $15^a$ will be moved to the left so as to connect the passage 31 with the passage 35, and permit the fluid in the reservoir 34 to exhaust to the atmosphere. The main slide valve $21^b$ may be again moved into release position, and the operation just described repeated as many times as desired, or required for the gradual release of the brakes.

Having now described my invention, what I claim as new and desire to secure by Letters Patent, is:—

1. In a fluid pressure brake, the combination, with means for applying and releasing the brakes, of means for effecting a graduation of the release of the brakes by pressure of the exhaust from the brake cylinder.

2. In a fluid pressure brake, the combination, with means for applying and releasing the brakes, of means operated by pressure from the brake cylinder exhaust for controlling and graduating the release of the brakes.

3. In a fluid pressure brake, the combination, with a triple valve device, of means controlled by fluid under pressure from the brake cylinder exhaust for effecting a graduation of the release of the brakes.

4. In a fluid pressure brake, the combination, with a valve device operated by variations in train pipe pressure for controlling the exhaust from the brake cylinder, of means for effecting a variation of pressure on said valve device, and mechanism operated by the brake cylinder exhaust for controlling said means.

5. In a fluid pressure brake, the combination, with a train pipe, auxiliary reservoir, and brake cylinder, and a valve device subject to the opposing pressures of fluid in the train pipe and in the auxiliary reservoir for controlling the exhaust from the brake cylinders, of means for effecting a variation in one of the pressures acting on said valve device, and mechanism operated by the brake cylinder exhaust for controlling said means.

6. In a fluid pressure brake, the combination, with a train pipe, an auxiliary reservoir, a triple valve, and a brake cylinder, of a valve device for effecting a variation in the pressure upon one side of the triple valve piston, and mechanism operated by the brake cylinder exhaust for controlling said device.

7. In a fluid pressure brake, the combination, with a train pipe, an auxiliary reservoir, a triple valve device, and a brake cylinder, of means controlled by the exhaust of fluid from the brake cylinder, for supplying fluid under pressure to the auxiliary reservoir.

8. In a fluid pressure brake, the combination, with a train pipe, an auxiliary reservoir, and a brake cylinder, of means for exhausting fluid under pressure from the brake cylinder, and means controlled by the exhausting fluid for effecting a cut off of the exhaust from the brake cylinder.

9. In a fluid pressure brake, the combination, with a train pipe, an auxiliary reservoir, and a brake cylinder, of means for exhausting fluid under pressure from the brake cylinder, and means controlled by the exhausting fluid for increasing pressure in the auxiliary reservoir and thereby effecting a cut off of the exhaust from the brake cylinder.

10. In a fluid pressure brake, the combination, with a train pipe, brake cylinder, and a valve device having a movable abutment subject to variations in train pipe pressure for controlling the exhaust from the brake cylinder, of a release controlling valve mechanism comprising a main valve and piston for controlling the pressure on one side of the first mentioned abutment, and means operated by the exhaust from the brake cylinder for varying the pressure on said piston.

11. In a fluid pressure brake, the combination, with a train pipe, auxiliary reservoir, triple valve, and brake cylinder, of a release controlling valve mechanism comprising a main valve and piston for controlling the pressure on one side of the triple valve piston, and a regulating valve and diaphragm operated by the exhaust from the brake cylinder for controlling the release of fluid from one side of said main valve piston.

In testimony whereof I have hereunto set my hand.

WALTER V. TURNER.

Witnesses:
 R. F. EMERY,
 J. B. MACDONALD.